US010481675B2

(12) United States Patent
Tsai et al.

(10) Patent No.: US 10,481,675 B2
(45) Date of Patent: Nov. 19, 2019

(54) DUAL-PROCESSOR SYSTEM AND CONTROL METHOD THEREOF

(71) Applicant: MStar Semiconductor, Inc., Hsinchu Hsien (TW)

(72) Inventors: Lin-Chung Tsai, Zhubei (TW); Fang-Sheng Lin, Zhubei (TW); Chih-Hsiang Chiu, Zhubei (TW); Hong-Chi Chen, Zhubei (TW)

(73) Assignee: XIAMEN SIGMASTAR TECHNOLOGY LTD, Shamen, Fujian (CN)

( * ) Notice: Subject to any disclaimer, the term of this patent is extended or adjusted under 35 U.S.C. 154(b) by 272 days.

(21) Appl. No.: 15/428,430

(22) Filed: Feb. 9, 2017

(65) Prior Publication Data

US 2017/0277250 A1 Sep. 28, 2017

Related U.S. Application Data

(60) Provisional application No. 62/313,153, filed on Mar. 25, 2016.

(51) Int. Cl.
*G06F 13/24* (2006.01)
*G06F 1/3293* (2019.01)
*G06F 1/3287* (2019.01)
*G06F 9/4401* (2018.01)

(52) U.S. Cl.
CPC .......... *G06F 1/3293* (2013.01); *G06F 1/3287* (2013.01); *G06F 9/441* (2013.01); *G06F 13/24* (2013.01)

(58) Field of Classification Search
None
See application file for complete search history.

(56) References Cited

U.S. PATENT DOCUMENTS

| | | | | |
|---|---|---|---|---|
| 6,134,619 A | * | 10/2000 | Futral | G06F 13/126 709/204 |
| 6,522,078 B1 | * | 2/2003 | Okamoto | H05B 37/0272 307/116 |
| 2002/0196744 A1 | * | 12/2002 | O'Connor | H04L 29/06 370/254 |
| 2008/0040458 A1 | * | 2/2008 | Zimmer | G06F 16/10 709/220 |

(Continued)

*Primary Examiner* — Elias Mamo
(74) *Attorney, Agent, or Firm* — Edell, Shapiro & Finnan, LLC

(57) ABSTRACT

A dual-processor system includes a power supply, a temporary memory, a non-volatile memory and two processors. The non-volatile memory stores an initialization program code, a first configuration file corresponding to a first operating system, and a second configuration file corresponding to a second operating system. Compared to the first operating system, the second operating system has a shorter interrupt latency and a shorter thread switching latency. After the power supply starts to supply power, the first processor executes the initialization program code to perform operations of initializing the temporary memory, loading the second configuration file into the temporary memory, notifying the second processor to fetch the second configuration file from the temporary buffer, loading the first configuration rile into the temporary memory and establishing the first operating system according to the first configuration file.

16 Claims, 6 Drawing Sheets

(56) References Cited

U.S. PATENT DOCUMENTS

| | | | |
|---|---|---|---|
| 2011/0106282 A1* | 5/2011 | Craig | G06F 9/545 |
| | | | 700/94 |
| 2013/0125118 A1* | 5/2013 | Niesser | G06F 9/455 |
| | | | 718/1 |
| 2017/0061856 A1* | 3/2017 | Lai | G09G 3/2092 |

* cited by examiner

DUAL-PROCESSOR SYSTEM AND CONTROL METHOD THEREOF

This application claims the benefit of U.S. provisional application Ser. No. 62/313,153, filed Mar. 25, 2016, the subject matter of which is incorporated herein by reference.

BACKGROUND OF THE INVENTION

Field of the Invention

The invention relates to an electronic system comprising dual processors.

Description of the Related Art

Under the consideration of convenience, an outdoor surveillance equipment is usually powered by a battery. Therefore, how to reduce power consumption to prolong the utilization time of a battery is one essential design goal.

To prevent missing critical images, a surveillance system starts video capturing once a change arises in the ambient environment. To prevent a latency caused by a boot process, the surveillance system usually keeps staying in a standby state. However, being in the standby state over an extended period of time results in a large amount of power consumption and shortens the utilization time of the battery.

SUMMARY OF THE INVENTION

The invention is directed to a dual-processor system and a control method thereof to solve the above issues.

A dual-processor system is provided according to an embodiment of the present invention. The dual-processor system includes a power supply, a temporary memory, a non-volatile memory, a first processor and a second processor. The non-volatile memory stores an initialization program code, a first configuration file corresponding to a first operating system, and a second configuration file corresponding to a second operating system. Compared to the first operating system, the second operating system has a shorter interrupt latency and a shorter thread switching latency. The first processor is predetermined to operate under the first operating system. The processor is predetermined to operate under the second operating system. After the power supply starts to supply power, the first processor loads the initialization program code from the temporarily memory and executes the initialization program code to sequentially perform operations of initializing the temporary memory, loading the second configuration file from the non-volatile memory into the temporarily memory, notifying the second processor to fetch the second configuration file from the temporary memory to establish the second operating system, loading the first configuration file from the non-volatile memory into the temporary memory and establishing the first operating system according to the first configuration file.

A control method for a dual-processor system is further provided according to another embodiment of the present invention. The dual-processor system includes a power supply, a temporary memory, a non-volatile memory, a first processor and a second processor. The non-volatile memory stores a first configuration file corresponding to a first operating system, and a second configuration file corresponding to a second operating system. Compared to the first operating system, the second operating system has a shorter interrupt latency and a shorter thread switching latency. According to the control method, after the power supply starts to supply power, the first processor sequentially performs operations of initializing the temporary memory, loading the second configuration file from the non-volatile memory into the temporary memory, notifying the second processor to fetch the second configuration file from the temporary memory to establish the second operating system, loading the first configuration file from the non-volatile into the temporary memory, and establishing the first operating system according to the first configuration file.

The above and other aspects of the invention will become better understood with regard to the following detailed description of the non-limiting embodiments. The following description is made with reference to the accompanying drawings.

Figure 1:
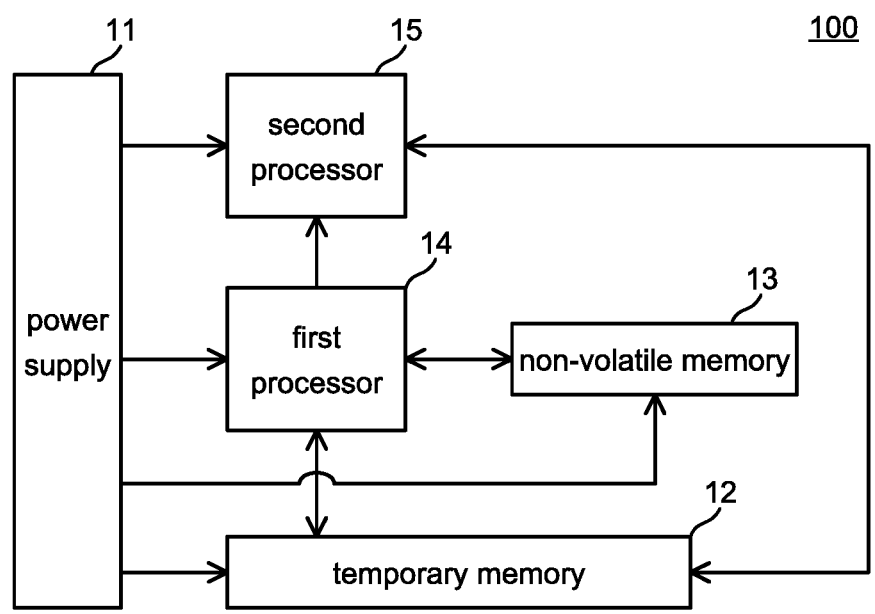
FIG. 1 is a block diagram of a dual-processor system according to an embodiment of the present invention.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

FIG. 1 shows a dual-processor system 100 according to an embodiment of the present invention. The dual-processor system 100 includes a power supply 11, a temporary memory 12, a non-volatile memory 13, a first processor 14 and a second processor 15. In a waiting period, i.e., when the dual-processor system 100 is not required to perform a task such as video capturing, the power supply 11 does not supply power to the first processor 14 and the second processor 15. In practice, the power supply 11 may be, for example but not limited to, a battery.

The scope of the present invention is not limited to a specific storage mechanism. The temporary memory 12 may be a static random access memory (SRAM) or a dynamic random access memory (DRAM), and the non-volatile memory 13 may be a read-only memory (ROM) or a flash memory. The present invention is not limited to the above examples.

Figure 2:
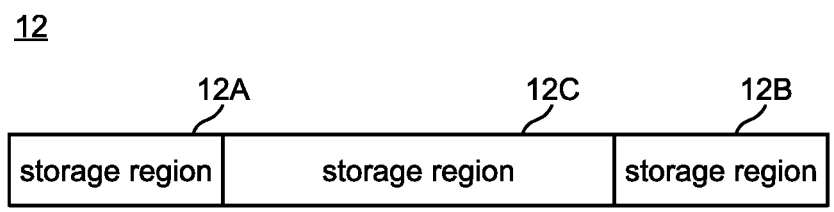
FIG. 2 is an exemplary storage space configuration in a temporary memory.

FIG. 2 shows an example of a memory storage configuration of the temporary memory 12. A storage region 12A is accessible to only the first processor 14; storage regions 12B and 12C are accessible to both of the first processor 14 and the second processor 15.

The non-volatile memory 13 stores an initialization program code, a first configuration file corresponding to a first operating system, and a second configuration file corresponding to a second operating system. More specifically, a configuration file includes a program code and associated data for a processor to accordingly establish an operating system. It should be noted that, implementation details of establishing an operating system according to a configuration file are generally known to one person skilled in the art, and shall be omitted herein.

In the dual-processor system 100, the first processor 14 is preset to operate under the first operating system, and the second processor 15 is preset to operate under the second operating system. Further, compared to the first operating system, the second operating system has a shorter interrupt latency and a shorter thread switching latency. For example but not limited to, the first operating system may be a Linux operating system, and the second operating system may be a real-time operating system (RTOS).

In one embodiment, when the power supply 11 starts to supply power, the temporary memory 12, the non-volatile memory 13, the first processor 14 and the second processor 15 are powered. First, the first processor 14 may load the initialization program code from the non-volatile memory 13 into an internal memory (not shown), which may be an SRAM have a capacity for sufficiently storing the initialization program code. The first processor 14 then starts executing the initialization program code to perform an initialization process 300 shown in FIG. 3.

Figure 3:
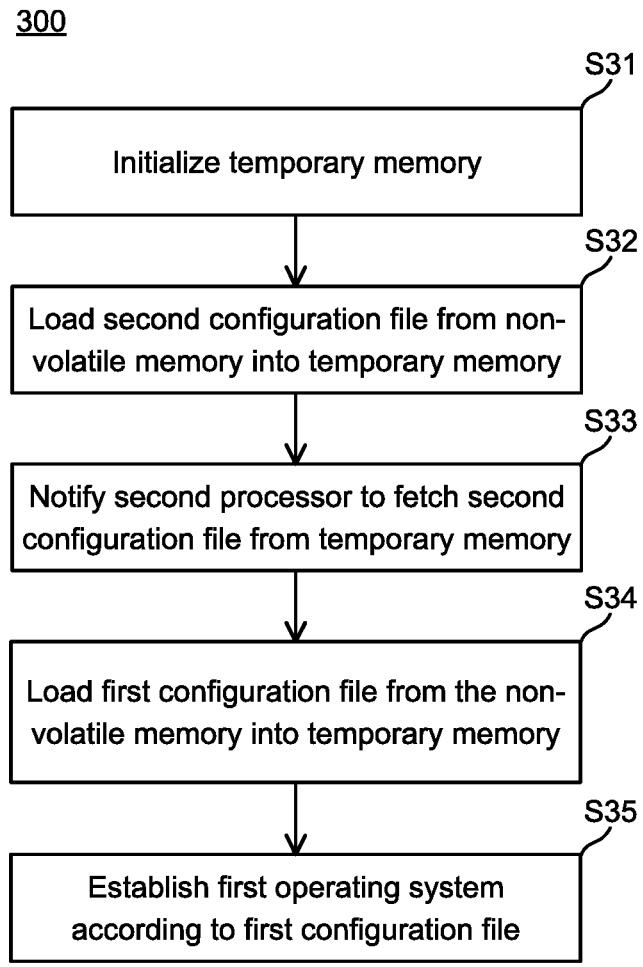
FIG. 3 is a flowchart of an initialization process according to an embodiment of the present invention.

Referring to FIG. 3, in step S31, the first processor 14 initializes the temporary memory 12 to cause the temporary memory 12 to be accessible to the first processor 14 and the second processor 15. In step S32, the first processor 14 loads the second configuration file from the non-volatile 13 into the temporary memory 12, e.g., storing the second configuration file into the storage region 12B of the temporary memory 12. In step S33, the first processor 14 notifies the second processor 15 to start establishing the second operating system. For example, the first processor 14 sets a register of the second processor 15 to trigger the second processor 15 to start establishing the second operating system according to the second configuration file stored in the storage region 12B of the temporary memory 12. In step S34, the first processor 14 loads the first configuration file from the non-volatile memory 13 into the temporary memory 12, e.g., storing the first configuration file to the storage region 12A. In step S35, the first processor 14 establishes the first operating system according to the first configuration file stored in the storage region 12A.

Known from the above description, the first processor 14 is prioritized to assist the second processor 15 to establish the second operating system before it starts establishing its first operating system. Compared to the first operating system (e.g., a Linux operating system), because the second operating system (e.g., an RTOS) has a shorter interrupt latency and a shorter thread switching latency, the second processor 15 can establish the second operating system before the first processor 14 completes establishing the first operating system. Thus, even the dual-processor system 100 does not keep staying in a standby state, once the power supply 11 starts to supply power, the second processor 15 in the dual-processor system 100 is capable of completing establishing the second operating system and starting performing a task. In one embodiment, the second processor 15 starts performing a task of capturing an external update, before the first processor completes establishing the first operating system. Thus, the dual-processor system 100 may be promptly activated to perform the task of video capturing to minimize the probability of missing critical images. Further, as the dual-processor system 100 may be promptly activated to perform the task of video capturing without being in a standby state over an extended period of time, power consumption is saved and a utilization time of a battery is prolonged.

Figure 4:
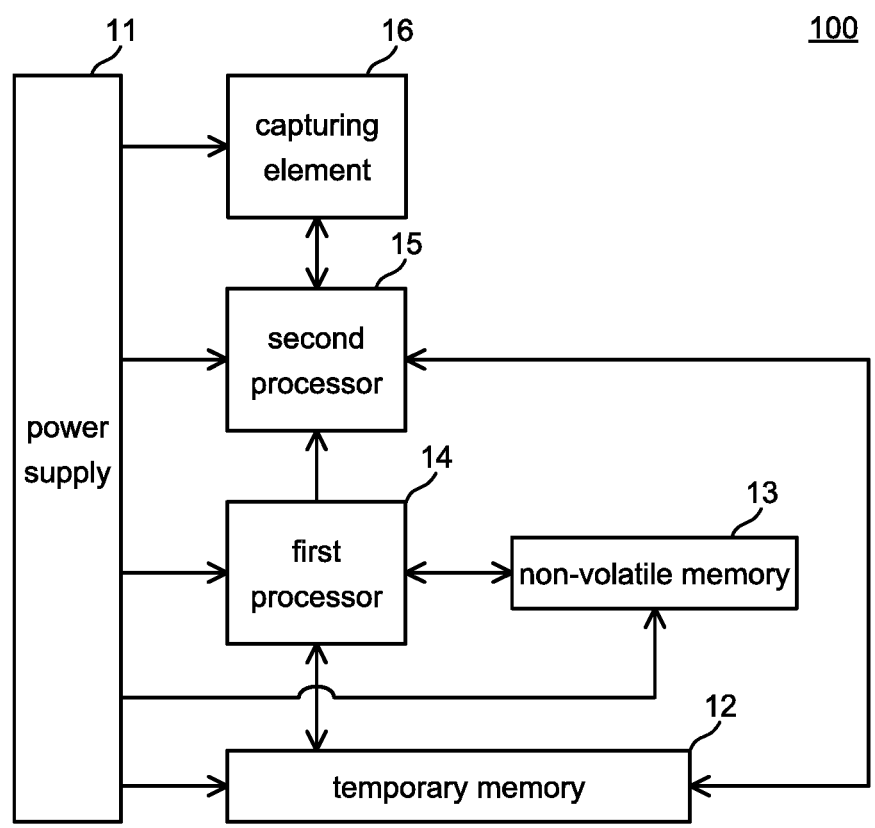
FIG. 4 is a block diagram of a dual-processor system according to another embodiment of the present invention.

Referring to FIG. 4, the dual-processor system 100 may further include a capturing element 16 coupled to the second processor 15 and the temporary memory 12. In one embodiment, after completing establishing the second operating system (e.g., an RTOS), the second processor 15 executes a driver of the capturing element 16, so as to control the capturing element 16 to capture an external update and to store the external update to the storage region 12C in the temporary memory 12. For example, the external update may be a still image, a dynamic image or a sound, and the capturing element 16 may include a photographing device, a video recording device or a sound recording device. In one embodiment, before storing the external update to the temporary memory 12, the second processor 15 may perform a compression process on the external update received from the capturing element 16, and store the compressed external update to the storage region 12C of the temporary memory 12.

Figure 5:
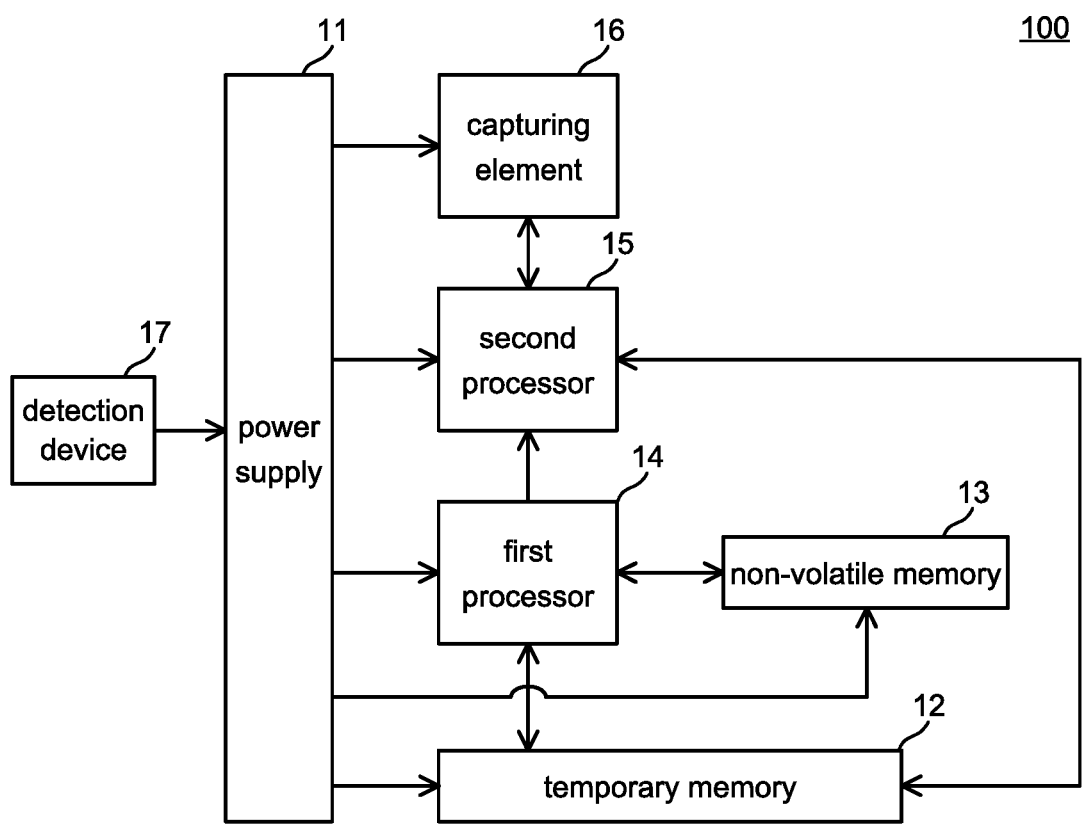
FIG. 5 is a block diagram of a dual-processor system according to another embodiment of the present invention.

Referring to FIG. 5, the dual-processor system 100 may further include a detection device 17 coupled to the power supply 11. The detection device 17 detects an ambient environment condition, and requests the power supply 11 to start supplying power when the ambient environment condition satisfies a predetermined condition. For example, the detection device 17 may be realized by an infrared detector cooperating with a power control module (PMU), and the predetermined condition may be detecting a movement of an external object. When the infrared detector detects a movement of an external object, the infrared detector transmits a signal to the PMU to start supplying power to the components in the dual-processor system 100, e.g., the temporary memory 12, the first processor 14, the second processor 15 and the capturing element 16.

Figure 6:
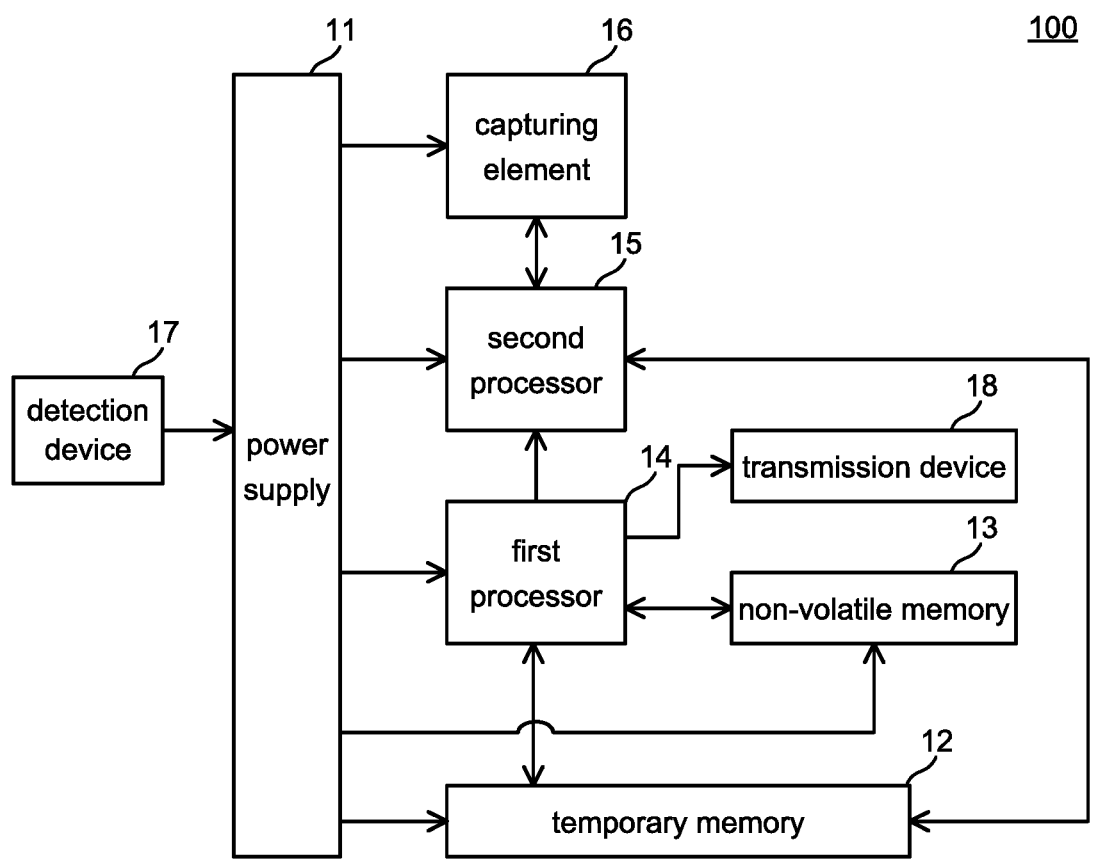
FIG. 6 is a block diagram of a dual-processor system according to another embodiment of the present invention.

Referring to FIG. 6, the dual-processor system 100 may further include a transmission device 18 coupled to the first processor 14. In one embodiment, after completing establishing the first operating system (e.g., a Linux operating system), the first processor 14 may fetch the external update from the storage region 12C of the temporary memory 12, and request the transmission device 18 to send the external update to a remote storage system, a surveillance system or a mobile device. For example, the transmission device 18 may be a wireless transmission chip.

Figure 7:
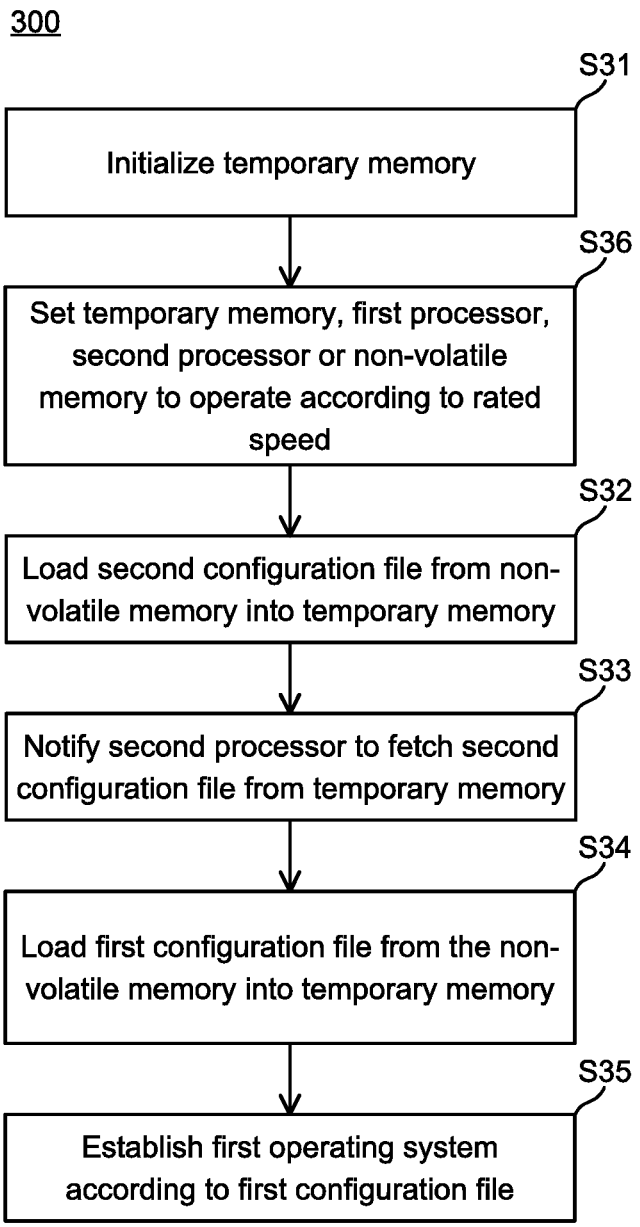
FIG. 7 is a flowchart of an initialization process according to another embodiment of the present invention.

In one embodiment, as shown in FIG. 7, the initialization process 300 may further include step S36 between steps S31 and S32. In step S36, the temporary memory 12, the non-volatile memory 13, the first processor 14 or the second processor 15 is set to operate at a rated speed i.e., a maximum speed). For example, the temporary memory 12, the non-volatile memory 13, the first processor 14 and the second processor 15 are all set to operate at a rated speed, and the dual-processor system 100 is allowed to more promptly start operating.

In the above embodiments, the second processor 16 executes the driver of the capturing element 16 to control the capturing element 16 to capture the external update only after completing establishing the second operating system (e.g., an RTOS). However, the present invention is not limited to such example. For example, in another embodiment, without establishing any operating system, the second processor 15 may directly execute the driver of the capturing element 16 to control the capturing element 16 to capture the external update.

A control method for a dual-processor system is further provided according to another embodiment of the present invention. The dual-processor system includes a power supply, a temporary memory, a non-volatile memory, a first processor and a second processor. The non-volatile memory stores a first configuration file corresponding to a first operating system, and a second configuration file corresponding to a second operating system. Compared to the first operating system, the second operating system has a shorter interrupt latency and a shorter thread switching latency. According to the control method, in a waiting period, the power supply does not supply power to the first processor and the second processor. After the power supply starts supplying power, the first processor sequentially performs the initialization process 300 in FIG. 3. One person skilled in the art can understand that, the operation variations in the description associated with the dual-processor system 100 are applicable to the control method of the dual-processor system, and shall be omitted herein.

A non-transient computer-readable storage medium is provided according to another embodiment of the present invention. The non-transient computer-readable storage medium includes a program code executable by a dual-processor system. The dual-processor system includes a temporary memory, a first processor and a second processor. The program code includes an initialization program code, a first configuration file corresponding to a first operating system and a second configuration file corresponding to a second operating system. Compared to the first operating system, the second operating system has a shorter interrupt latency and a shorter thread switching latency. In practice, the non-transient computer-readable storage medium may be an electronic, magnetic or optical storage device, e.g., a ROM, a RAM, a CD-ROM, a DVD, a magnetic tape, a floppy disk or a hard drive. The program code may be realized by various program languages. It should be noted that, the operation variations of the dual-processor system 100 are applicable to the non-transient computer-readable storage medium, and shall be omitted herein.

While the invention has been described by way of example and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A dual-processor system, comprising:
   a power supply;
   a temporary memory;
   a non-volatile memory, storing a first configuration file corresponding to a first operating system and a second configuration file corresponding to a second operating system, the second operating system having a shorter interrupt latency and a shorter thread switching latency compared to the first operating system;
   a first processor; and
   a second processor;
   wherein, after the power supply starts supplying power to the first processor, the first processor performs operations of:
   initializing the temporary memory;
   loading the second configuration file into the temporary memory;
   notifying the second processor to establish the second operating system according to the second configuration file in the temporary memory;
   loading the first configuration file into the temporary memory; and
   establishing the first operating system according to the first configuration file in the temporary memory; and
   before the first processor completes establishing the first operating system, the second processor has completed establishing the second operating system.

2. The dual-processor system according to claim 1, further comprising:
   a detection device, coupled to the power supply, detecting an ambient environment condition;
   wherein, in response to having detected that the ambient environment condition satisfies a predetermined condition, the power supply starts supplying power to the first processor.

3. The dual-processor system according to claim 1, further comprising:
   a capturing element, coupled to the second processor and the temporary memory;
   wherein the second processor controls the capturing element to capture an external update and to store the external update into the temporary memory after the second processor completes establishing the second operating system.

4. The dual-processor system according to claim 3, wherein the second processor controls the capturing element to start capturing the external update before the first processor completes establishing the first operating system.

5. The dual-processor system according to claim 3, further comprising:
   a transmission device, coupled to the first processor;
   wherein, the first processor fetches the external update from the temporary memory and requests the transmission device to send the external update.

6. The dual-processor system according to claim 1, wherein the first operating system is a Linux operating system.

7. The dual-processor system according to claim 1, wherein the second operating system is a real-time operating system (RTOS).

8. The dual-processor system according to claim 1, wherein the first processor sets one of the temporary memory, the non-volatile memory, the first processor and the second processor to operate at a rated speed.

9. A control method for a dual-processor system, the dual-processor system comprising a power device, a temporary memory, a non-volatile memory, a first processor and a second processor; the non-volatile memory storing a first configuration file corresponding to a first operating system and a second configuration file corresponding to a second operating system, the second operating system having a shorter interrupt latency and a shorter thread switching latency compared to the first operating system; the control method comprising:
   after the power supply starts supply power to the first processor:
   initializing the temporary memory by the first processor;
   loading the second configuration file into the temporary memory by the first processor;

notifying the second processor to establish the second operating system according to the second configuration file in the temporary memory by the first processor;

loading the first configuration file into the temporary memory by the first processor; and establishing the first operating system according to the first configuration file by the first processor;

wherein, before the first processor completes establishing the first operating system, the second processor has completed establishing the second operating system.

10. The control method according to claim 9, further comprising:

detecting an ambient environment condition; and in response to having detected that the ambient environment condition satisfies a predetermined condition, starting supplying power to the first processor by the power supply.

11. The control method according to claim 9, further comprising:

controlling a capturing element to capture an external update and to store the external update into the temporary memory by the second processor after the second processor completes establishing the second operating system.

12. The control method according to claim 11, further comprising:

controlling the capturing element to start capturing the external update by the second processor before the first processor completes establishing the first operating system.

13. The control method according to claim 11, further comprising:

fetching the external update from the temporary memory and requesting a transmission device to send the external update by the first processor.

14. The control method according to claim 9, wherein the first operating system is a Linux operating system.

15. The control method according to claim 9, wherein the second operating system is a real-time operating system (RTOS).

16. The control method according to claim 9, further comprising:

setting one of the temporary memory, the non-volatile memory, the first processor and the second processor to operate at a rated speed by the first processor.

\* \* \* \* \*